Oct. 29, 1963   K. Z. HUSZAR   3,108,488

GEAR

Filed Sept. 30, 1957

INVENTOR.
KALMAN Z. HUSZAR,
BY Allen & Allen
ATTORNEYS.

United States Patent Office 3,108,488
Patented Oct. 29, 1963

3,108,488
GEAR
Kalman Z. Huszar, Foster, Ohio
Filed Sept. 30, 1957, Ser. No. 687,037
1 Claim. (Cl. 74—465)

My invention resides in the provision of an improved gear and, more specifically, in an arrangement wherein the teeth of the gear are formed by tightly wrapping a chain about the perimeter of a disc.

It is now common practice to form gears by cutting teeth into the perimeter of a disc or blank. This is a very expensive operation requiring special tools and skilled operators. The manufacture of such gears is quite time-consuming. As the gear size increases so apparently does the complexness of the tooth-forming operation and mechanism required.

A primary object of my invention is to provide a gear which is the full equivalent with respect to quality of those presently made but which is much simpler and more economical to manufacture.

A specific object of my invention is to provide a gear wherein the teeth are formed by wrapping a chain about the periphery of a disc as distinguished from cutting the individual teeth into such periphery.

Figure 1:
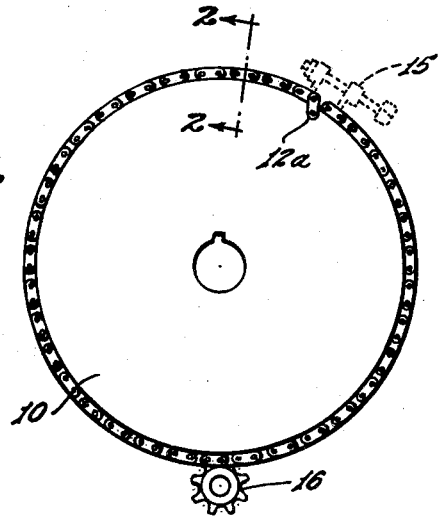
Figure 2:
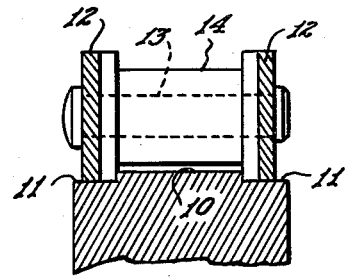
Figure 3:
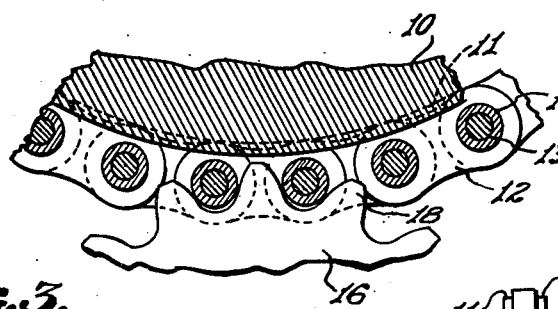
Figure 4:
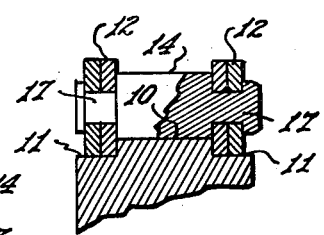
Figure 7:
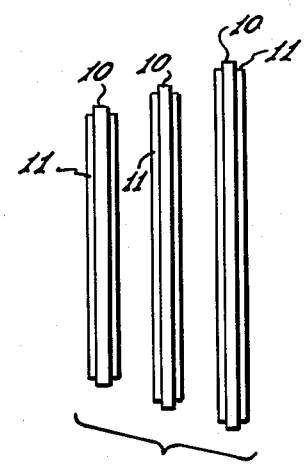
Figures 5, 6:
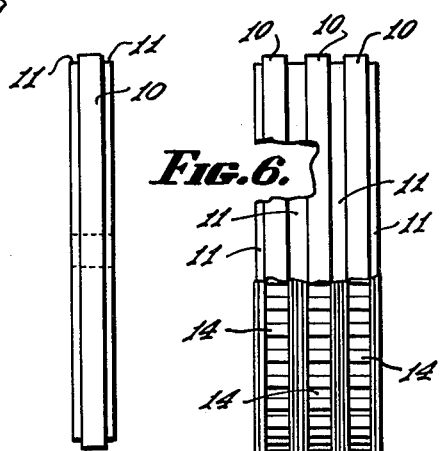

These and other objects of my invention will become apparent to those skilled in the art from a reading of the description to follow and with reference to the accompanying sheet of drawings, in which drawings like numerals are employed to designate like parts and in which:

FIGURE 1 is a side elevation of a gear constructed according to the teachings of my invention, also illustrating in perspective a clamping mechanism for engaging the chain about the disc and further illustrating a sprocket having teeth to engage the chain, FIGURE 2 is an enlarged section taken on the line 2—2 of FIGURE 1, FIGURE 3 is an enlarged fragmentary sectional view showing the chain about the disc and the engagement therewith of the teeth on a sprocket, FIGURE 4 is an enlarged fragmentary section illustrating an alternative manner of engaging a chain on the disc, FIGURE 5 is a front view of a suitable disc, FIGURE 6 illustrates my invention as applied in a multiple drive and, FIGURE 7 is a view illustrating different sizes of discs which may be employed in the invention.

Referring now to FIGURES 1, 5 and 7 it will be observed that I employ a disc 10 having an annular shoulder 11 on each side. These shoulders 11, of course, extend throughout the periphery of the disc 10. It will be apparent to those skilled in the art that such shoulders may be formed by turning them on a lathe which is a relatively simple operation. In some cases the disc or blank 10 might be cast or formed to include such shoulders, although a final smoothing or finishing operation by the use of a lathe would probably be desired. The important thing is to provide the disc or blank 10 with the shoulders 11 as shown.

The gear teeth are formed simply by tightly wrapping a chain about the periphery of the blank 10. In general these chains may be of two basic types. The larger sizes will usually be of the type shown in FIGURE 2 wherein the chain comprises side plates 12, a pin 13 and a roller 14 rotatable on the pin 13 between the plates 12. In this arrangement the chain is wrapped about the disc so that the plates 12 engage the shoulders 11 in such manner that the roller 14 is clear of the periphery of the disc 10 and therefore free to rotate on the pin 13. Such a chain may be applied to the disc 10 in the manner generally indicated at FIGURE 1 wherein a clamping mechanism is shown in dotted lines as indicated at 15. It will be obvious that any such mechanism may be employed to draw the chain tight about the disc periphery whereupon the link or plate 12a will be moved to such position that a pin 13 may be placed through it and the adjoining link or plate thereby to secure the chain in position. It has been found that the engagement of the relatively large number of plates 12 with the shoulders 11 gives, when the chain is tightened, a good non-slip arrangement of the chain and disc. The rotatable members 14 give an extremely good, non-friction gear action. A sprocket 16 will engage these rollers and it will be understood that such sprocket will be of the size for which the chain was intended.

In those cases in which a gear of relatively small size is desired I have found the arrangement of FIGURE 4 to be advantageous. In this figure there is shown a chain which includes the side plates or links 12 but wherein the roller 14 has stud shafts 17 formed integral therewith, which shafts are received in the links 12. In this arrangement the rollers 14 will bear against the periphery of the blank 10 and the plates 12 will again bear on the shoulders 11. Again an excellent gripping relationship between the disc and chain is obtained although in the arrangement of FIGURE 4 the advantages of a rotatable member 14 are lost. As stated, this will usually be the case when small gears employing small chains are utilized.

FIGURE 3 further illustrates the invention involving the arrangement of FIGURE 2. Thus it will be observed that the plates or links 12 bear against the shoulders 11 while the members 14 remain free of the outer extremity of the disc 10 and are therefore free to rotate on the pins 13. The teeth 18 of a suitable sprocket 16 are shown in engagement with various of these rollers 14.

In FIGURE 6 I have illustrated how the gear of this invention may be employed in multiple drives. Thus I have illustrated three discs 10 placed in side by side relationship, each having chains with plates bearing on the shoulders 11 of the respective disc. A plurality of sprockets 16 will engage the various teeth-forming chains.

It will be apparent to those skilled in the art that modifications may be made in the basic teachings of my invention without departing from the scope and spirit thereof. It is also to be understood that while I have shown my invention as embodied in certain specific structures and arrangements, I do not intend to be limited to these except insofar as they are specifically set forth in the subjoined claim.

Having thus described my invention, what I claim as new and what I desire to protect by United States Letters Patent is:

A gear comprising a circular blank having a pair of peripheral shoulders and a projecting rim, one shoulder at either side of said rim, and a chain including links engaging the shoulders and the adjacent side face of said rim, said chain being disposed tightly about the periphery of said blank, and means in said chain to receive the teeth of a sprocket.

References Cited in the file of this patent

UNITED STATES PATENTS

| | | |
|---|---|---|
| 1,078,836 | Curtis | Nov. 18, 1913 |
| 2,310,393 | Carter | Feb. 9, 1943 |
| 2,346,424 | Griffith | Apr. 11, 1944 |
| 2,605,646 | Karlsson et al. | Aug. 5, 1952 |
| 2,720,119 | Sherman | Oct. 11, 1955 |

FOREIGN PATENTS

| | | |
|---|---|---|
| 19,608 | Great Britain | Aug. 24, 1905 |
| 854,301 | Germany | Nov. 4, 1952 |